(No Model.) 2 Sheets—Sheet 1.
H. W. THURSTON.
WEIGHING TRUCK.
No. 441,451. Patented Nov. 25, 1890.
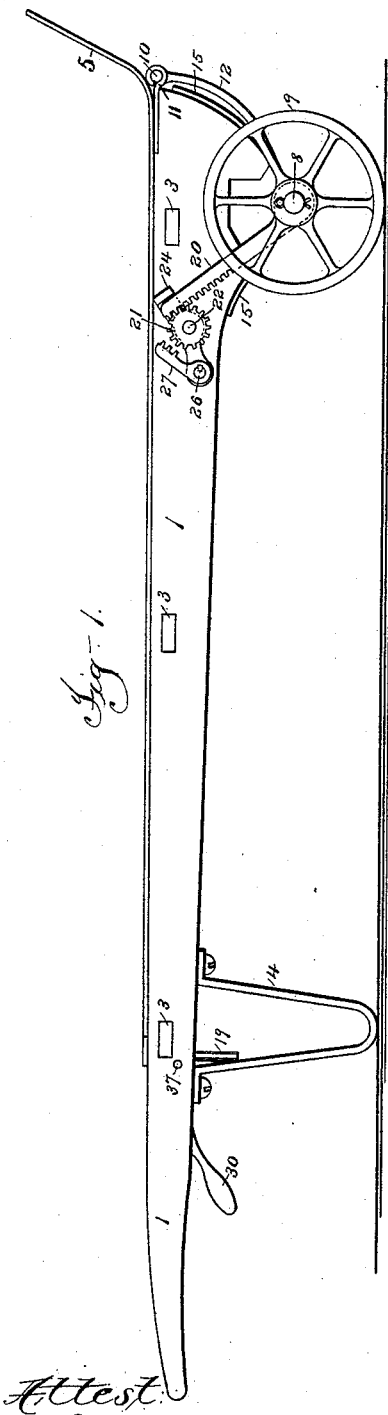
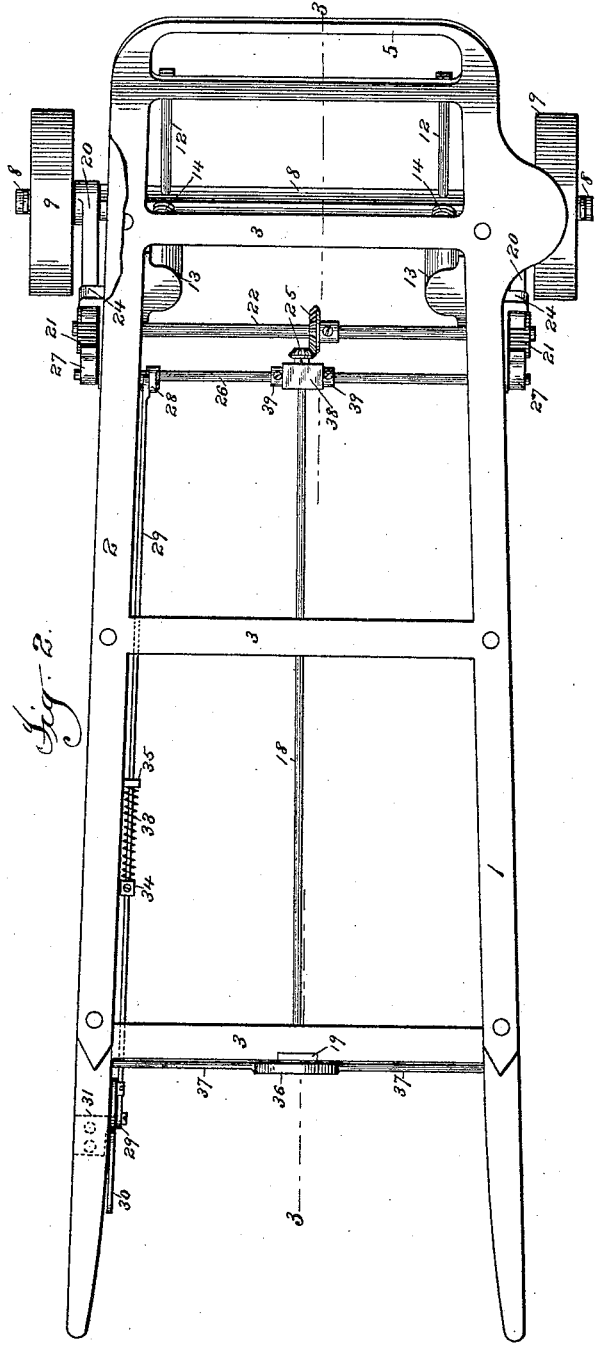

(No Model.) 2 Sheets—Sheet 2.
H. W. THURSTON.
WEIGHING TRUCK.
No. 441,451. Patented Nov. 25, 1890.
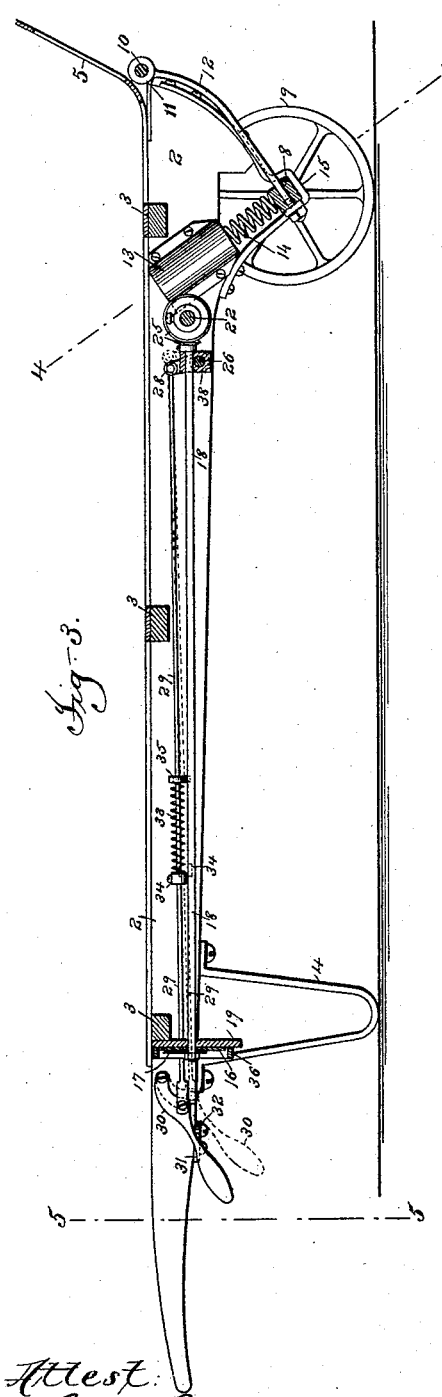
Attest:
Geo. H. Potts
J. J. Kennedy
Inventor
Henry W. Thurston
by Philipp, Phelps, Huey
Attys

UNITED STATES PATENT OFFICE.

HENRY W. THURSTON, OF BROOKLYN, NEW YORK, ASSIGNOR TO EMERY N. DOWNS, OF SAME PLACE.

WEIGHING-TRUCK.

SPECIFICATION forming part of Letters Patent No. 441,451, dated November 25, 1890.

Application filed April 14, 1890. Serial No. 348,268. (No model.)

*To all whom it may concern:*

Be it known that I, HENRY W. THURSTON, a citizen of the United States, residing at Brooklyn, county of Kings, and State of New York, have invented certain new and useful Improvements in Weighing-Trucks, fully described and represented in the following specification and the accompanying drawings, forming a part of the same.
This invention relates to trucks used for the movement of merchandise, the object of the invention being to provide an improved means by which the weight of the load placed upon the body of the truck shall be automatically indicated.

While my invention is of general application in all cases in which a truck-body may be supported from the axle by weighing-springs, it is intended especially for use with the common class of hand-trucks mounted on two wheels. A weighing-truck of this class is covered by my Letters Patent No. 425,271, and the present invention consists in various improvements applicable thereto, which will be more particularly described in the specification, and pointed out in the claims.

A full description of my invention will now be given, reference being had to the accompanying drawings, forming a part of this specification, in which—

Figure 1 is a side elevation of a hand-truck embodying my improvements. Fig. 2 is a plan view of the same, one of the truck-ears being broken away to show parts of the weighing mechanism. Fig. 3 is a section on the line 3 3 of Fig. 2. Fig. 4 is a section on the line 4 4 of Fig. 3. Fig. 5 is a section on the line 5 5 of Fig. 3. Fig. 6 is a detail hereinafter referred to.

Referring now to the drawings, the truck shown is of the ordinary form, consisting of side frames 1 2, united by cross-bars 3, and provided with supporting-legs 4 at the handle end and with a lifting-shoe 5 at the opposite end. The axle 8, upon which are loosely mounted the wheels 9, has a swinging connection with the truck-body, this connection being formed by means of a fulcrum-rod 10, extending transversely of the truck-body and mounted in bearings 11, attached thereto.

This fulcrum-rod 10 is provided with arms 12, preferably curved, as shown, which are secured to the axle 8. Mounted on the inside of the side frames are pockets 13, in which are held and guided springs 14, these springs being attached to the axle 8 and supporting the truck-body thereon. The expansion of the springs 14 and movement of the body away from the axle are limited by the bands 15, one of which is secured to each side frame and passes under the axle 8, thus holding the body and axle against the force of the springs 14.

The weight-indicator consists, preferably, of a pointer 17, moving over a dial 16, supported by the front cross-bar 3. This pointer 17 is secured to and carried by a shaft 18, extending longitudinally of the truck-body and mounted to rotate in supports 19 38, the front support 19 depending from the front cross-bars 3 and serving also to carry the dial 16.

The indicator is connected with the axle, so that the movement of the truck-body toward the axle shall move the pointer in accordance with the weight of the load upon the truck by the following means: Loosely mounted upon each end of the axle 8, and preferably outside of the side frames, as shown, is a rack-bar 20, these rack-bars engaging pinions 21, mounted rigidly upon a shaft 22, extending transversely of the frame and being held in engagement therewith by lugs 24 upon the side frames. The movement of the body is transmitted through the shaft 22 to the shaft 18 and the pointer 17 by means of bevel-gears 25.

For the purpose of locking the body and axle in their normal positions, thus preventing any movement of the body and axle relatively to each other and rendering the weighing mechanism inoperative, a shaft 26 extends transversely of the frame and is provided with rack-arms 27, adapted to engage the pinions 21 when the shaft 26 is rotated into one position, thus locking the shaft 22 against rotation. The shaft 26 is provided with a crank-arm 28 inside the side frame, from which a connecting-rod 29 extends to the handle end of the truck, this rod being connected at its front end to a handle 30, pivoted to the side frame in a convenient position. A locking-plate 31 (shown in detail in Fig. 6) is secured to the under side of the frame, and is provided with an ear 32. The handle 30 springs outward to pass the ear 32 as it is thrown forward, and is then locked in its forward position thereby. The shaft 26 carries also the rear support 38 for the shaft 18, this support being loose on the shaft 26 and held in position longitudinally of the shaft by collars 39, secured to the shaft.

Upon the release of the handle 30 from the locking-plate 31, the shaft 26 and handle 30 are returned to their normal positions and held therein by a coil-spring 33, surrounding the connecting-rod 29 and held under tension by means of a collar 34 on the rod and an ear 35 upon the frame, through which the rod 29 slides.

If the dial 16 and the pointer 17 were unprotected, the truckman, in leaning over the front cross-bar 3, as is common in loading or unloading such trucks, would interfere with the pointer 17. To avoid this I use a metallic casing 36, surrounding the dial and projecting forward sufficiently to prevent contact with the pointer or dial. This casing may be supported by a cross-bar 37, secured in the frame, or in any other suitable manner.

The operation of the device is as follows: A load having been placed, as usual, upon the truck-body, the handle end of the truck is raised and the truck held in such a position that the center of gravity of the load shall be in the line of spring action, which for ordinary loads is substantially the position required for wheeling, this position varying somewhat, however, with the size and form of the load. The weight of the truck-body and load is now sustained by the weighing-springs 14, and the compression of these springs and consequent movement of the body toward the axle will vary with the load. The movement of the body toward the axle rotates the shaft 22 by the movement of the pinions 21 on the rack-bars 20, and this rotation is transmitted to the pointer 17, as previously described. By the use of the positive driving-connections between each end of shaft 22 and the axle the pressure upon the springs 14 is equalized, so that in case the load be placed to one side or the other of the truck the compression of the two springs will be exactly the same, and the weight of the load in all cases be exerted in the same line and against the same resistance. The indications of the weight-indicator are therefore directly comparable whatever be the form or position of the load, thus enabling the truck to weigh with great accuracy. This connection also prevents any sidewise strain upon the springs, the pressure upon the spring or springs being the same at both sides of the truck. It is evident that this means of equalizing the pressure upon the springs, so that the full tension of the springs is overcome by the weight in all cases, whatever may be the position of the load longitudinally of the axle, may be employed independently of any special connection to the weight-indicator, and this construction in itself forms a part of my invention.

If it be desired to use the truck without the weighing apparatus, the body and axle will be locked in their normal relative positions by throwing the lever 30 forward, thus rocking the shaft 26 to carry the rack-arms 27 into engagement with the gears 21, by which the shaft 22 will be held against rotation, and thereby any movement of the gears on the rack-bars 20 prevented. Thus the gears and rack-bars are locked together and a rigid connection formed between the body and axle. To unlock the parts and throw the weighing mechanism into operation, it is necessary only to spring the handle 30 outside the ear 32, when the shaft 26 and rack-arms will be returned to their normal positions by the spring 33. Two weighing-springs are shown, one at each side, and this is the preferred construction; but it is evident that the number of springs used may be varied, and that other changes may be made without departing from my invention.

What I claim is—

1. The combination, with the body and axle of a truck, the body having a swinging connection with the axle, of one or more weighing-springs between the body and axle, a shaft carried by the body and parallel with the axle, positive driving-connections between the shaft and each end of the axle, and a weight-indicator operated by the movement of the body against the tension of the springs, substantially as described.

2. The combination, with the body and axle of a truck, the body having a swinging connection with the axle, of one or more weighing-springs between the body and the axle, a shaft carried by the body and parallel with the axle, positive driving-connections between the shaft and each end of the axle, and a weight-indicator operated by said shaft, substantially as described.

3. The combination, with the body and axle of a truck, the body and the axle having a swinging connection, of weighing-springs between the body and the truck, a shaft carried by the body and parallel with the axle, independent rack and pinion connections between the shaft and each end of the axle, and a weight-indicator operated by the movement of the body against the tension of the springs, substantially as described.

4. The combination, with the body and axle of a truck, the body having a swinging connection with the axle, of weighing-springs between the body and axle, rack-bars loosely mounted on each end of said axle, a shaft provided with a pinion at each end engaging said rack-bars, the rack-bars being positively held in engagement with said pinions, and a weight-indicator operated from said shaft, substantially as described.

5. The combination, with the body and axle of a truck, the body having a swinging connection with the axle, of one or more weighing-springs between the body and axle, and means for locking the body and axle in the positions in which they are normally held by the weighing-springs, substantially as described.

6. The combination, with the body and axle of a truck, the body having a swinging connection with the axle, of one or more weighing-springs between the body and the axle, a rack-bar carried by said axle, a shaft carried by the body and provided with a pinion engaging the rack-bar, the rack-bar being positively held in engagement with said pinion, a weight-indicator operated by said shaft, and means for locking the pinion against rotation, whereby the weighing devices are rendered inoperative, substantially as described.

7. The combination, with the body and axle of a truck and weighing mechanism operated by the movement of the body, of rack-bars 20, carried by the axle, shaft 22, having pinions 21 engaging the rack-bars, shaft 26, having rack-arms 27 and crank-arm 28 and connecting-rod 29 and handle 30, substantially as described.

8. The combination, with the body and axle of a truck and weighing mechanism operated by the movement of the body, of rack-bars 20, carried by the axle, shaft 22, having pinions 21 engaging the rack-bars, shaft 26, having rack-arms 27 and crank-arm 28, connecting-rod 29, handle 30, locking-plate 31, and returning-spring 33, substantially as described.

In witness whereof I have hereunto set my hand in the presence of two subscribing witnesses.

HENRY W. THURSTON.

Witnesses:
   THOS. G. PRINGLE,
   HENRY J. OLDRING, Jr.